Feb. 6, 1940.                M. HUSCHKA                2,189,421
                        FOWL-DRESSING APPLIANCE
                          Filed Feb. 28, 1939
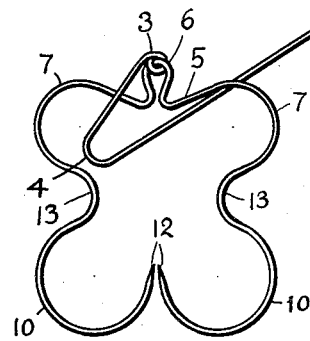
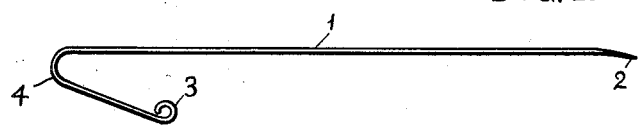
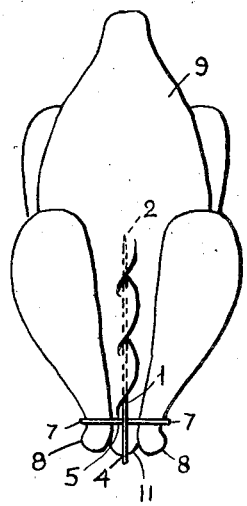  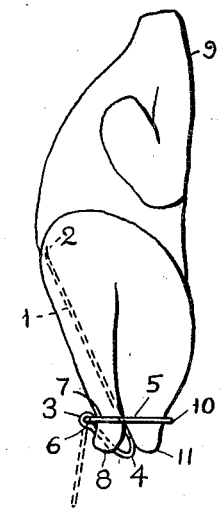
MARIA HUSCHKA
INVENTOR.
BY  John P. Nixon
ATTORNEY.

Patented Feb. 6, 1940

2,189,421

UNITED STATES PATENT OFFICE 2,189,421

FOWL-DRESSING APPLIANCE

Maria Huschka, New York, N. Y.

Application February 28, 1939, Serial No. 258,915

5 Claims. (Cl. 17—11)

My invention relates to fowl-dressing appliances and has particular reference to appliances for temporarily closing an access opening formed in the belly of a fowl for its dressing or stuffing. The access opening is usually closed by stitching with a piece of thread, using an ordinary needle. This method is not very effective, however, and has numerous disadvantages, being slow and difficult and not suitable for holding the legs of the fowl together.

In view of the recognized disadvantages of the ordinary stitching method, efforts have been made to provide metal needles and fixtures for closing the belly without any threads. The known devices of this type, however, have certain disadvantages, particularly since they lack proper provisions for firmly retaining the device and to draw its legs together. The main difficulty is caused by the fact that the fowl during the process of its cooking more or less shrinks, and, being greasy, it readily slides out of ordinary clamping or holding devices used with the needles.

My invention has for its object, therefore, to provide a fowl-dressing appliance which can be used for closing the belly opening and, at the same time, for drawing the legs of the fowl together and holding them firmly against the tail during the cooking process, so that the cooked bird has a trim and attractive appearance and is convenient for handling.

For this purpose I provide a device in the form of a sharp needle which can be used for inserting into the edges of the dressing opening in the belly of the fowl, thereby closing the opening. I also provide a ring for holding the fowl's legs together, the ring being hingedly connected with the rear end of the needle. In order to retain the ring firmly in its position thereby also retaining the needle, I provide the ring with an inwardly extending sharp projection which can be inserted into the tail of the fowl.

In order to simplify assembling and cleaning of my device, I provide for a detachable connection between the needle and the ring, the latter being of the open type, so that the needle can be removed from the ring. The needle being pivotally retained in operative relation with respect to the ring by adjacent portions of a resilient constricted loop portion of the ring.

Other objects and advantages of my invention will be apparent from the disclosure in the accompanying specification and drawing, in which—

Fig. 1 is a perspective view of my appliance.

Fig. 2 is a side view of the needle separately from the ring.

Fig. 3 is a bottom view of a carcass of a fowl with my appliance in the operative position.

Fig. 4 is a side view of the fowl with my appliance.

My appliance consists of a needle 1 having a sharp point 2 at the front end and a small loop 3 at the rear end, the needle being bent at the rear end so to form an open loop 4. The loop 3 is hingedly fitted over a resilient wire ring 5, the latter being provided with a small loop 6 in the middle. The sides of the loop 6 are brought together to form a clearance slightly smaller than the thickness of the needle so that the latter can be resiliently forced into its position in the loop 6 or can be removed again, as for cleaning, etc. The wire ring 5 has two loops 7 at the top for the legs 8 of a fowl 9 and two similar loops 10 at the bottom for the tail 11 of the fowl. The sharp ends 12 of the wire are bent inwardly and are brought close together, forming a projection for inserting into the tail when the needle and the ring are placed in the proper operative position. The wire of the ring is bent inwardly at 13, thereby separating the two sets of loops 7 and 10.

My appliance is used as follows:

The needle 1 is held in the operator's hand, turning the ring 5 upward. The sides of the belly opening are held in the other hand and the needle is inserted, forming a series of stitches. I have found that a very convenient joint is obtained by inserting the needle by overhand stitches as shown in Fig. 3. The end of the needle is buried in the carcass to avoid danger for the operator's hands. The ring is then in the position shown in dotted lines in Fig. 4. The legs are then inserted in the loops 7. The legs and the tail are then tightly drawn together, the tail entering the middle portion of the ring past the sharp points 12, which are then inserted into the tail at the point opposite the small loop 6. The ring 5 is thus placed in its operative position, almost at right angles to the needle.

These operations are faciliated by the shape of the ring, which is open in the middle and has four partly open loops at the corners so that the legs and the tail can be freely moved inside the ring while the latter is being turned from the position indicated in dotted lines in Fig. 4 to the final position shown in solid lines. The ring is sufficiently large so that in the latter position the tail can be drawn toward the legs through the open central portion of the ring, thereby clearing the sharp projections 12. The latter can be then inserted into the tail, securely locking the device on the carcass.

My appliance therefore serves a double purpose, first, to close the access opening in the fowl's belly and second, to hold together the legs and the tail of the fowl. The arrangement of the double loops on the ring 5 facilitates its fitting over the legs and tail of the fowl, and the sharp points provide an anchoring means for securely holding the device in position. It should be noted that, without such sharp points as are provided in my device, the ring will readily slide off its place, and such clamping means as rely on friction only will not remain long in place, since the carcass of the fowl shrinks and moves during cooking, and clamps will not stay under such conditions on the greasy and slippery carcass.

I claim as my invention:

1. A fowl-dressing appliance comprising a needle adapted to be inserted into the carcass of a fowl from the rear for closing an access opening in its belly and a loop-shaped member formed of a piece of wire with sharpened ends, the rear end of the needle being hingedly connected to the middle portion of the wire, the ends of the wire being inwardly bent at a point opposite the hinged connection for the needle, the wire having separate portions thereof shaped for engaging the legs of the fowl, the sharp points of the wire being adapted to be inserted into the tail of the fowl for retaining the appliance in an operative position.

2. A fowl-dressing appliance comprising a needle adapted to be inserted into the carcass of a fowl from the rear for closing an access opening in its belly and provided with a small loop at the rear end and a piece of wire having a small loop-shaped portion hingedly engaging the needle loop and itself bent into a loop adapted to engage the legs of the fowl, the ends of the wire being bent inwardly and adapted to be inserted into the tail of the fowl at an angle to the needle, thereby retaining the appliance in an operative position.

3. A fowl-dressing appliance comprising a needle adapted to be inserted into the carcass of a fowl from the rear for closing an access opening in its belly and provided with a small loop at the rear end and a piece of wire having a small loop hingedly engaging the needle loop and itself bent into a loop adapted to engage the legs of the fowl, the ends of the wire being adapted to be inserted into the tail of the fowl in a direction substantially transverse to the needle thereby, retaining the appliance in an operative position.

4. A fowl-dressing appliance comprising a needle adapted to be inserted into the carcass of a fowl from the rear for closing an access opening in its belly and provided with a small loop at the rear end and a piece of resilient wire having a small loop hingedly engaging the needle loop and partly closed over the thickness of the needle at the loop, the needle being thereby resiliently and removably retained in the engagement with the wire, the wire being formed into a loop, adapted to engage the legs of the fowl, the ends of the wire being bent inwardly and the ends thereof being directed toward the said small loop and adapted to be inserted into the tail of the fowl.

5. A fowl-dressing appliance comprising a needle adapted to be inserted into the carcass of a fowl from the rear for closing an access opening in its belly and a member of a partly closed contour, open at the lower portion thereof and formed with four loops opened inwardly into an open middle space in the said member, the rear end of the needle being hingedly connected with the upper portion of the said member between the two upper open loops, the said member having an inwardly extending sharp projection at each side of the lower portion between the two lower open loops, the upper loops being adapted to engage the legs of the fowl, the lower loops being adapted to engage the tail of the fowl, and the projections being adapted to be inserted into the tail for holding the appliance in an operative position.

MARIA HUSCHKA.